US011046443B2

(12) United States Patent
Tanriover

(10) Patent No.: US 11,046,443 B2
(45) Date of Patent: Jun. 29, 2021

(54) SAFETY SYSTEMS FOR UNMANNED VEHICLES

(71) Applicant: Intel Corporation, Santa Clara, CA (US)

(72) Inventor: Cagri Tanriover, Bethany, OR (US)

(73) Assignee: INTEL CORPORATION, Santa Clara, CA (US)

( * ) Notice: Subject to any disclaimer, the term of this patent is extended or adjusted under 35 U.S.C. 154(b) by 802 days.

(21) Appl. No.: 15/805,475

(22) Filed: Nov. 7, 2017

(65) Prior Publication Data
US 2019/0039743 A1 Feb. 7, 2019

(51) Int. Cl.
| B64D 25/00 | (2006.01) |
| E05B 81/08 | (2014.01) |
| E05F 1/00 | (2006.01) |
| E05B 77/54 | (2014.01) |
| B64C 39/02 | (2006.01) |

(52) U.S. Cl.
CPC ............ *B64D 25/00* (2013.01); *B64C 39/024* (2013.01); *E05B 77/54* (2013.01); *E05B 81/08* (2013.01); *E05F 1/00* (2013.01); *B64C 2201/024* (2013.01); *B64C 2201/108* (2013.01); *B64C 2201/185* (2013.01); *B64D 2201/00* (2013.01); *E05Y 2900/502* (2013.01)

(58) Field of Classification Search
CPC ...... B64D 45/06; B64D 2201/00; B64D 1/14; B64D 17/80; B64C 25/56; B64C 25/30; B64C 25/00; B64C 2201/185; B64C 1/062; B64C 1/32
See application file for complete search history.

(56) References Cited

U.S. PATENT DOCUMENTS

| 5,259,574 A * | 11/1993 | Carrot ..................... B64C 25/56 244/100 A |
| 8,888,129 B2 * | 11/2014 | Arzanpour ............ B60R 21/261 280/751 |
| 8,979,023 B1 * | 3/2015 | Wang ..................... B64C 25/56 244/100 A |
| 9,056,661 B2 * | 6/2015 | Macri ...................... B63C 9/26 |
| 10,336,453 B2 * | 7/2019 | Chan ........................ B64D 1/08 |
| 2016/0251083 A1 | 9/2016 | Tsaliah et al. |
| 2016/0332739 A1 * | 11/2016 | Wong ..................... B64D 25/00 |
| 2018/0022310 A1 * | 1/2018 | Olson ..................... B64C 25/56 244/100 A |

(Continued)

OTHER PUBLICATIONS

The Foam Factory, "The Differences and Relationship Between Foam's Density, Weight, and Firmness", Oct. 11, 2011. Accessed Aug. 7, 2020 on https://www.thefoamfactory.com/blog/index.php/the-differences-and-relationship-between-foams-density-weight-and-firmness (Year: 2011).*

(Continued)

*Primary Examiner* — Richard R. Green
(74) *Attorney, Agent, or Firm* — Hanley, Flight & Zimmerman, LLC

(57) ABSTRACT

Safety systems for unmanned vehicles are disclosed. An example vehicle includes a housing and a propulsion system supported by the housing. The propulsion system to generate lift. An anti-crash module is coupled to the housing. The anti-crash module has a compressible foam that is to deploy to protect the propulsion system from an impact.

20 Claims, 12 Drawing Sheets

(56) References Cited

U.S. PATENT DOCUMENTS

2020/0231291 A1* 7/2020 Wakatsuki ............. B64D 45/00

OTHER PUBLICATIONS

Flyability, Elios Inspect & Explore Indoor and Confined Spaces, www.flyability.com, last retrieved on Feb. 12, 2018 from https://www.flyability.com/wp-content/uploads/dlm_uploads/2017/11/flyability_Elios_Brochure-LW.pdf, 15 pages.
Parrot Minidrones Rolling Spider, User guide, 2014, 16 pages.
Parazero Drone, Safety Solutions, hfips://parazero.com/our-solutions/, 3 pages, last retrieved from www.parazero.com on Feb. 12, 2018, 3 pages.
Johnathon Feist, Drone Fall safety—how to fly, the science of flight, http://www.dronerush.com/drone-fall-safety-science-of-flight-11216/, Dec. 10, 2017, 6 pages.

* cited by examiner

SAFETY SYSTEMS FOR UNMANNED VEHICLES

FIELD OF THE DISCLOSURE

This disclosure relates generally to unmanned vehicles, and, more particularly, to safety systems for unmanned vehicles.

BACKGROUND

Over the years, unmanned vehicles, or drones, have become increasingly sophisticated. For example, some unmanned vehicles are hybrid vehicles that can perform both aerial and land missions.

BRIEF DESCRIPTION OF THE DRAWINGS

FIG. 3A is an enlarged portion of the example anti-crash module of FIG. 3.

Figure 1:
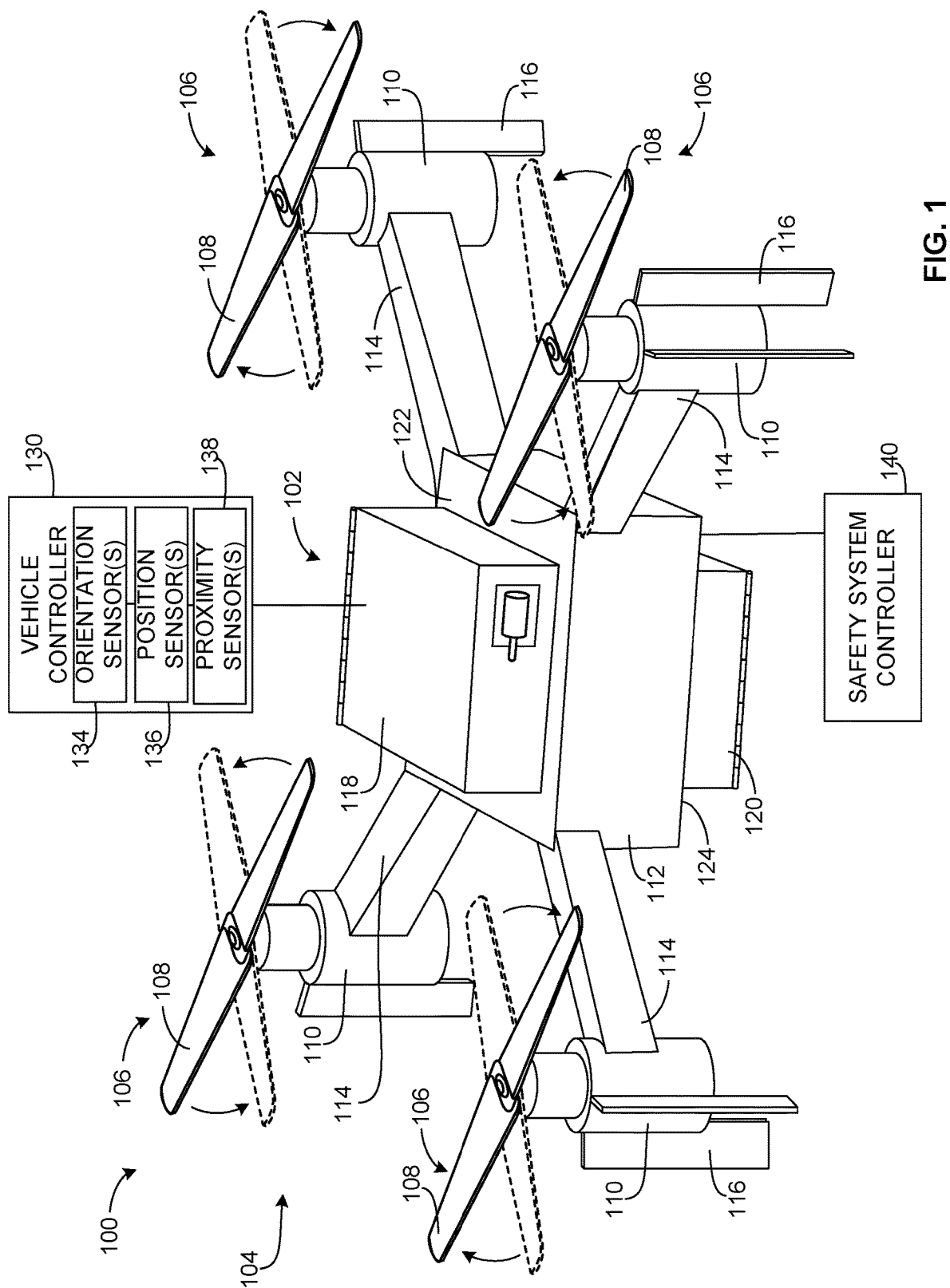
FIG. 1 is a perspective view of an example unmanned vehicle implemented with a safety system constructed in accordance with the teachings of this disclosure.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts. Stating that a part is coupled or connected to another part indicates that the parts are jointed directly or through one or more intervening parts. Thus, physical contact is not required for two parts to be coupled or connected.

DETAILED DESCRIPTION

For purposes of explanation, examples disclosed herein are described with respect to unmanned vehicles (e.g., drones). However, the teachings disclosed herein may be suitably adapted to other types of vehicles, aircraft, or other machines (e.g. robots) that may move autonomously.

To generate lift, unmanned aerial vehicles typically include a propulsion system having propellers that are driven by motors. The motors, body, camera and/or other payloads may be a significant cost of the unmanned aerial vehicles. Thus, repairing damage to the motors and/or to other body portions of the unmanned vehicles due to accidents or collisions involving unmanned vehicles may be costly. For example, accidents of unmanned aerial vehicles occur due to human error and/or unexpected technical errors such as, for example, broken communication links or channels between the unmanned vehicle and a remote control, depleted battery, etc.

To protect unmanned vehicles from damage that may result from accidents, some known unmanned vehicles employ relatively expensive and sophisticated anti-crash modules. However, such expensive and/or sophisticated systems may not be practicable for lower cost unmanned vehicles and/or available for unmanned vehicles having less capable computing power or sophistication.

Due to the sophistication and/or costs of redundant systems of unmanned vehicles, some unmanned vehicles employ less expensive safety systems. For example, some example safety systems include a cage structure. However, such known cage structures provide protection for impacts at speeds that are less than approximately 15 km/hr (e.g., the cage structures may be crash tolerant up to a top speed of 15 km/hr). However, unmanned vehicles in free fall typically impact or crash into the ground or objects at speeds greater than 15 km/hr. Additionally, cage structures may be disadvantageous because they often interfere or obstruct an onboard camera (e.g., the cage structure is included in videos and pictures taken during flight). Another example crash proof device includes two relatively large wheels adjacent ends of the unmanned vehicle. The diameters of the wheels are typically large and encompass a height of the propellers and motors. However, such wheels are typically relatively thin and may be effective at protecting the components of the unmanned vehicle against free fall from a height of only a few meters (e.g., 2 meters).

Other example anti-crash modules include parachute systems. However, parachute systems may not be suitable multirotor platforms because a parachute, when deployed, may get tangled with the propellers. Further, due to slow response time of parachute systems, parachute systems may not be effective for imminent emergencies (e.g., imminent impacts or collisions) and are typically deployed for unmanned vehicle recovery rather than as a protection mechanism for accidents (e.g., an unexpected crash).

Some known unmanned vehicles employ a twirling system (e.g., a spiral contoured body) provided by a shape of a body of the unmanned vehicle. Such known twirling systems may be effective when propellers of an unmanned vehicle are not in motion and there are no environmental cross-wind conditions. In instances in which the motors fail (e.g., a stored energy in the battery has depleted) and the unmanned vehicle is in free fall, the unmanned vehicle may spin or twirl due to the aerodynamic shape or contour of the body to generate lift. However, because the twirling action may not immediately create sufficient lift for the unmanned vehicle, the twirling system may not suitable during imminent emergencies or crashes. Hence, such twirling systems are more suited for unmanned aerial vehicle recovery rather than a protection mechanism for accidents.

Another example anti-crash module includes an airbag. Some airbag systems may include two separate airbags that deploy to act as a giant bubble-wrap enclosing an entire drone in response to an imminent accident detection. Although effective, such system requires additional inflation mechanisms that increase an overall weight and manufacturing costs of the unmanned vehicle. For example, airbag systems are relatively more expensive compared to the alternative solutions noted above. In some examples, the average cost of one airbag system for an unmanned vehicle is approximately $575.00. In some examples, the cost of the airbag system relative to the cost of the unmanned vehicle may range between 19% and 145%. Thus, for relatively inexpensive unmanned vehicles (e.g., unmanned vehicles that cost less than $1,000.00), an airbag solution may not be a practical solution. Additionally, such airbag systems require installation during manufacturing, and cannot be retrofit to existing unmanned vehicles.

Further, airbag systems employ a chemical component (i.e. sodium azide) that can be hazardous to the environment. For example, an inflator of an airbag system includes sodium azide ($Na_2NO_3$) because it burns rapidly (e.g., immediately) when ignited and generates large amounts of nitrogen gas as a byproduct to inflate a pouch that provides a cushion (e.g., during a crash) in a matter of milliseconds. For example, burning 132.6 grams of sodium azide produces 50 liters of nitrogen gas in 20 to 30 milliseconds. Although this amount of sodium azide seems relatively small in absolute terms, at 200 parts per million, sodium azide may sterilize soil (e.g., killing all bacteria and fungi) and can also change the chemistry of soil. Sodium azide is water-soluble and, therefore, spills of sodium azide could migrate into sewers, streams, lakes, and groundwater systems (e.g., drinking water). Given the increase usage of unmanned aerial vehicles, deploying unmanned vehicles with airbag systems may escalate the rate of sodium azide into the environment.

Example safety systems disclosed herein protect unmanned aerial vehicles during imminent crashes or emergencies. For example, example safety systems disclosed herein can be deployed almost instantaneously to protect an entire body of the unmanned vehicle. Example safety systems disclosed herein are lightweight, rapidly deployable systems. Specifically, example safety systems disclosed herein enable rapid deployment of lightweight foams (e.g., sponges) that may protect an entire structure of the unmanned vehicle. For example, safety systems disclosed herein deploy a compressible foam to protect components (e.g., propellers, motors, camera, etc.) of the unmanned vehicles. In some examples, the safety systems disclosed herein may employ one or more anti-crash modules that can be installed at different surfaces or parts a vehicle (e.g., a multi-rotor drone) depending on a size, shape and/or payload capabilities of the vehicle to provide protection to various portions of a vehicle during an impact or collision.

Additionally, some example safety systems disclosed herein may employ a compressible foam having one or more surfaces (e.g., via a shape of the foam, a flat surface of the foam, a size of the foam, etc.) the provide an air brake effect when a vehicle is in a free fall condition. For example, the surfaces of the compressible foam increase (e.g., maximize) air resistance during free fall to provide an air brake to slow a speed of the unmanned vehicle before a crash or impact to reduce (e.g., minimize) risk of damage to the unmanned vehicle. Thus, a vehicle implemented with an anti-crash module disclosed herein may be protected by a flexibility characteristic of the compressible foam surrounding the vehicle and by an air brake effect provided by the morphology/shape of the compressible foam during a fall.

Example safety systems disclosed herein provide an anti-crash solution to unmanned vehicles at a fraction of the cost compared to airbag solutions. For example, the cost of the proposed anti-crash safety system to the cost of the unmanned vehicle may range approximately between 5% and 40%. Additionally, unlike airbag systems, example safety systems disclosed herein do not require toxic chemical components to deploy. Example safety systems disclosed herein provide affordable and an environmentally friendlier alternative to an airbag solution. Further, the example safety systems disclosed herein are safer for the environment.

FIG. 1 is a perspective view of an example unmanned aerial vehicle (UAV) 100 employing a safety system 102 (e.g., an anti-crash module) constructed in accordance with the teachings of this disclosure. To generate lift and/or to maneuver or navigate the UAV 100 in an aerial mode of operation, the UAV 100 of the illustrated example includes a propulsion system 104.

The propulsion system 104 of the UAV 100 of the illustrated example includes one or more rotor assemblies 106 (e.g., a multi-rotor platform). Each of the rotor assemblies 106 of the illustrated example includes a rotor or propeller 108 (e.g., a blade) that is driven by a motor 110 (e.g., an electric motor such as a direct current (DC) motor). The motor 110 rotates the propeller 108 to generate lift and/or maneuver the UAV 100. In some examples, the propulsion system 104, the propellers 108 and/or the motors 110 provides means for generating or providing lift.

To support the rotor assemblies 106, the UAV 100 of the illustrated example includes a housing 112 (e.g., a body or a housing providing a frame for supporting components of the UAV 100). To support the respective ones of the rotor assemblies 106, the housing 112 of the illustrated example includes one or more arms 114. In some examples, the arms 114 provide means for supporting the propulsion system 104.

The UAV 100 of the illustrated example includes four rotor assemblies 106. As such, it may be referred to as a quad-copter. Thus, the housing 112 of the illustrated example includes four arms 114 to support the respective ones of the rotor assemblies 106. For example, the housing 112 of the illustrated example has an X-shaped profile. However, other UAV body and/or rotor configurations may alternatively be used such as, for example, a helicopter configuration (e.g., one horizontal rotor and one vertical rotor), a fixed wing configuration, etc. Moreover, the UAV 100 may include less than, or more than, four arms 114 and/or rotor assemblies 106. The housing 112 of the illustrated example supports landing gear 116 (e.g. legs).

The safety system 102 of the illustrated example includes a first anti-crash module 118 (e.g., an anti-crash foam housing) and a second anti-crash module 120 (e.g., an anti-crash foam housing). The first anti-crash module 118 of the illustrated example is coupled to a first portion or surface 122 (e.g., an upper surface) of the housing 112 and the second anti-crash module 120 of the illustrated example is coupled to a second portion or surface 124 (e.g., a lower surface) of the housing 112 opposite the first surface 122. In some examples, the first and second anti-crash modules 118 and 120 of the illustrated example may be coupled to the housing 112 via mechanical fastener(s) such as, for example, screw(s), bolt(s), loop and hook fastener(s), rivet(s), bracket(s), weld(s), and/or any other suitable fastener(s). In some examples, the first and second anti-crash modules 118 and 120 of the illustrated example may be coupled to the housing 112 via chemical fastener(s) such as, for example, adhesive, glue and/or any other suitable fastener(s). In some examples, the first and second anti-crash modules 118 and 120 of the illustrated example may be integrally formed with the housing 112 as a unitary piece or structure. Although the UAV 100 of the illustrated example includes the first and second anti-crash modules 118 and 120, the UAV 100 may include only the first anti-crash module 118, the second anti-crash module 120, or additional anti-crash modules.

To control the UAV 100, the UAV 100 of the illustrated example includes a vehicle controller 130. The vehicle controller 130 of the illustrated example may be implemented with an electrical device(s) and/or component(s) (e.g., high computing power systems electronic device(s) or component(s), a system on a chip (SoC), a microprocessor, etc.).

The UAV 100 of the illustrated example is provided with one or more orientation sensor(s) 134 to provide information indicative of the attitude or orientation of the UAV 100 to the vehicle controller 130. In some examples, the orientation sensor(s) 134 include accelerometers, gyroscopes, magnetic field sensors, etc. that are associated with an inertial measurement unit (IMU). To provide information indicative of the position or location of the UAV 100, the vehicle controller 130 of the illustrated example includes one or more position sensor(s) 136. The position sensor(s) 136 may include image sensors, a global position system (GPS), etc. In some examples, the UAV 100 of the illustrated example may include a communication interface to enable communications with a remote operator. The vehicle controller 130 of the illustrated example may include one or more proximity sensor(s) 138 to detect a proximity of the UAV 100 (e.g., the housing 112) relative to an external object (e.g., to detect a potential collision).

The vehicle controller 130 of the illustrated example generates control inputs provided to the motors 110 that are used to move the UAV 100 (e.g., by driving the propellers 108). Example control inputs that control the motors 110 include motor torque, angular velocity, and/or a combination of associated inputs that control the motors 110 of the UAV 100. In the illustrated example, there are four control inputs corresponding to four motors of a quadcopter (e.g., a four-motor unmanned vehicle). Based on the values of the control inputs, the vehicle controller 130 of the illustrated example (e.g., via, for example a model), produces corresponding outputs used to control the UAV 100 by, for example, adjusting the control inputs (e.g., torque and/or associated speed (e.g., angular velocity)) of each of the motors 110. In some examples, control inputs provided by the vehicle controller 130 are generated based on input data from the orientation sensor(s) 134, the position sensor(s) 136 and/or the proximity sensor(s) 138. For example, the vehicle controller 130 may be based on a control law (e.g., a mathematical model) defining movement of the UAV 100. For example, the mathematical model may determine outputs required from each motor 110 to move the UAV 100 along a determined trajectory.

To activate the safety system 102, the safety system 102 of the illustrated example employs a safety system controller 140. In some examples, the safety system controller 140 may be implemented or integrated with the vehicle controller 130. In some examples, the vehicle controller 130 provides a signal to the safety system controller 140 to activate the safety system 102. In some examples, the safety system controller 140 operates independently from the vehicle controller 130.

The housing 112 of the illustrated example contains or encloses electrical component(s) that enable operation of the UAV 100 and/or the safety system 102. For example, the housing 112 of the illustrated example houses the vehicle controller 130, the orientation sensor(s) 134, the position sensor(s) 136, the proximity sensor(s) 138 and/or the safety system controller 140. The housing 112 of the illustrated example houses a battery that provides power to the vehicle controller 130, the safety system 102, and the motors 110 of the UAV 100. In some examples, the safety system 102 of the illustrated example may include a power source (e.g., a battery) that is independent or separate from a power source (e.g., a battery) that provides power to the UAV 100 (e.g., the motors 110, the vehicle controller 130, the orientation sensor(s) 134, the position sensor(s) 136, the proximity sensor(s) 138, etc.).

Figure 2:
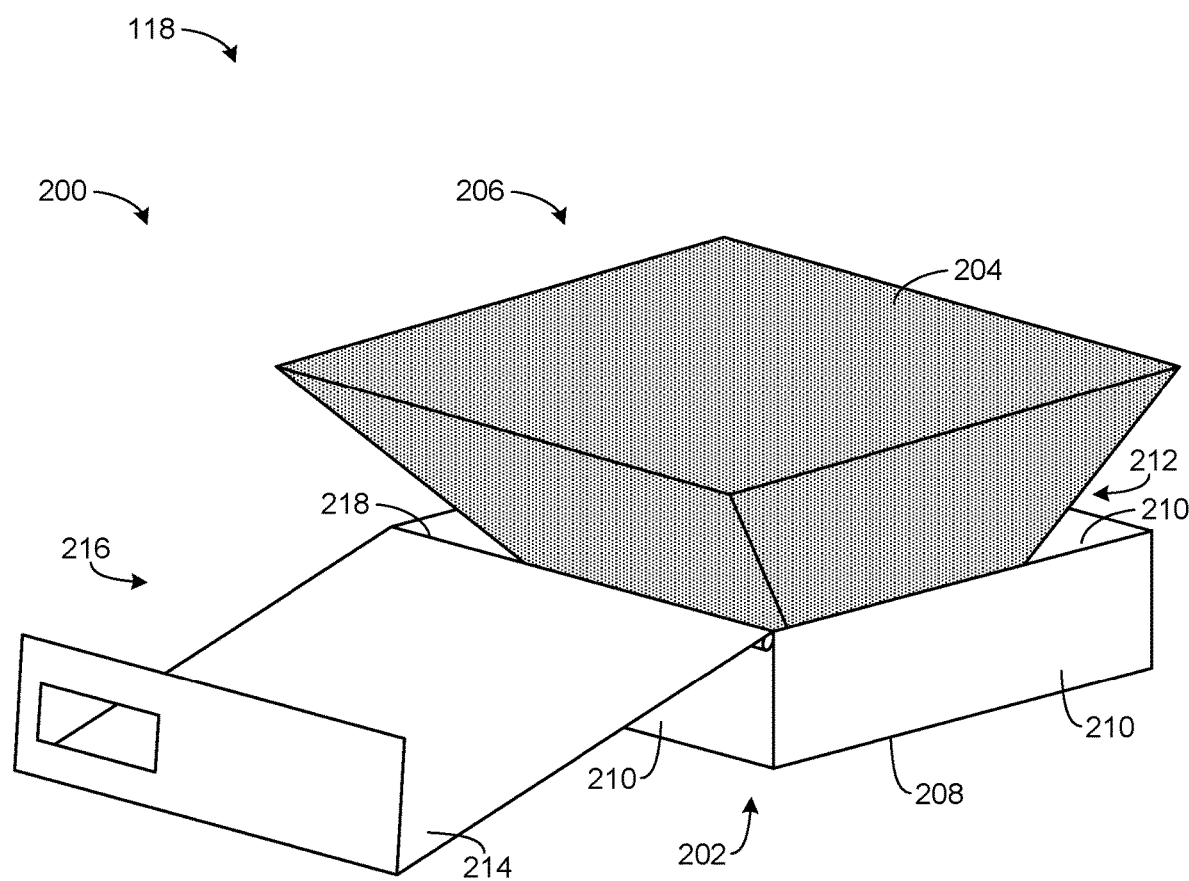
FIG. 2 is a perspective view of an anti-crash module of the example safety system of FIG. 1 shown in a deployed condition.

FIG. 2 is a perspective view of the first anti-crash module 118 of FIG. 1. The second anti-crash module 120 of the illustrated example is substantially similar or identical to the first anti-crash module 118 and, for brevity, the second anti-crash module 120 will not be described. The first anti-crash module 118 of the illustrated example is shown in a first or activated position 200 (e.g., a deployed position). The first anti-crash module 118 of the illustrated example includes an enclosure 202 (e.g., a housing) to enclose or house a compressible foam 204. To house or receive the compressible foam 204, the enclosure 202 of the illustrated example includes a base 208 having walls 210 defining a cavity 212. In some examples, the enclosure 202 provides means for housing or enclosing the compressible foam 204.

The compressible foam 204 of the illustrated example is shown in a non-compressed state 206. As used herein, a non-compressed state 206 means that the compressible foam 204 has a maximum dimensional footprint (e.g., a volume, a height, length and/or width, etc.) or, alternatively, a dimensional envelope of the compressible foam 204 cannot expand further. As used herein, a compressed state of the compressible foam 204 means that a dimensional footprint (e.g., a volume, a length, a width, a height, etc.) of the compressible foam 204 is smaller or less than the dimensional footprint (e.g., a volume, a length, a width, a height, etc.) of the compressible foam 204 is in the non-compressed state 206 (e.g., is less than the maximum footprint). In other words, in the non-compressed state, the compressible foam 204 can be squeezed or compressed to the compressed state. In the compressed state, the compressible foam 204 can expand or return to the non-compressed state 206.

In the non-compressed state 206, the compressible foam 204 projects or extends from the enclosure 202. To enable the compressible foam 204 to project from the enclosure 202 (e.g., the base 208), the cavity 212 of the illustrated example defines a dimensional footprint (e.g., a volume) that is smaller than a dimensional footprint (e.g., a volume) of the compressible foam 204 when the compressible foam 204 is in the non-compressed state 206. In other words, the compressible foam 204 of the illustrated example includes a dimensional footprint (e.g., a height, a length, a width) that is greater than a dimensional footprint (e.g., a height, a length, a width) of the enclosure 202 when the compressible foam 204 is in the non-compressed state 206.

In the non-compressed state 206, as shown for example in FIG. 2, the compressible foam 204 remains attached to the enclosure 202 (e.g., the base 208). To maintain the compressible foam 204 coupled to the enclosure 202 when the compressible foam 204 is in the non-compressed state 206, the compressible foam 204 is coupled (e.g., fixed or attached) to the base 208. For example, the compressible foam 204 of the illustrated example may be fixed to a bottom surface of the cavity 212 via adhesive, a hook and loop fastener, and/or any other suitable fastener(s).

To store the compressible foam 204 in the enclosure 202, the compressible foam 204 of the illustrated example, being highly flexible, can be compressed (e.g., squeezed) to fit inside the cavity 212 of the base 208. To maintain the compressible foam 204 in the compressed state when the compressible foam 204 is positioned inside the cavity 212 of the enclosure 202, the enclosure 202 of the illustrated example includes a cover 214 (e.g., a lid). Specifically, the cover 214 of the illustrated example is movably coupled to the base 208. The cover 214 of the illustrated example moves between a first or closed position 302 (e.g., shown in FIG. 3) to cover the cavity 212 (e.g., to prevent deployment of the compressible foam 204) and a second or open position 216 to uncover (e.g., expose) the cavity 212 (e.g., to allow deployment of the compressible foam 204). To pivotally couple the cover 214 and the base 208, the enclosure 202 of the illustrated example includes a hinge 218 (e.g., a piano hinge). The cover 214 of the illustrated example moves relative to the base 208 during deployment of the compressible foam 204 to fully expose the compressible foam 204 and/or allow the compressible foam 204 to expand to the non-compressed state 206. In the illustrated example, energy stored within the compressible foam 204 when compressed inside the enclosure 202 pushes against the cover 214 to move or bias the cover 214 to the open position 216.

In some examples, the enclosure 202 and/or the hinge 218 of the illustrated example may include a biasing element (e.g., a spring) to bias the cover 214 to the open position 216. In some examples, the cover 214 removably detaches from the enclosure 202 to deploy the compressible foam 204 of the first anti-crash module 118. In some examples, the cover 214 may include a lock (e.g., a lock 304 of FIG. 3) one each of the opposite ends (e.g., side faces) of the cover 214 that lock to maintain the cover 214 coupled to the enclosure 202 during non-deployment conditions and unlock to cause the cover 214 to removably detach from the enclosure 202 when the safety system 102 is deployed. In some such examples, the hinge 218 may not be needed. The enclosure 202 of the illustrated example has a rectangular shaped housing. However, in other examples, the enclosure 202 may have a square shape, a triangular shape, and/or any other shape. The enclosure 202 of the illustrated example can be made from a plastic material(s), a thermoplastic material(s), a metal material, aluminum, and/or any other material(s). For example, to reduce an overall weight of the first anti-crash module 118, the enclosure 202 may be made from lighter weight materials such as, for example, poly lactic acid (PLA), acylonitrile butadiene styrene (ABS), carbon fiber, etc.

Figure 3:
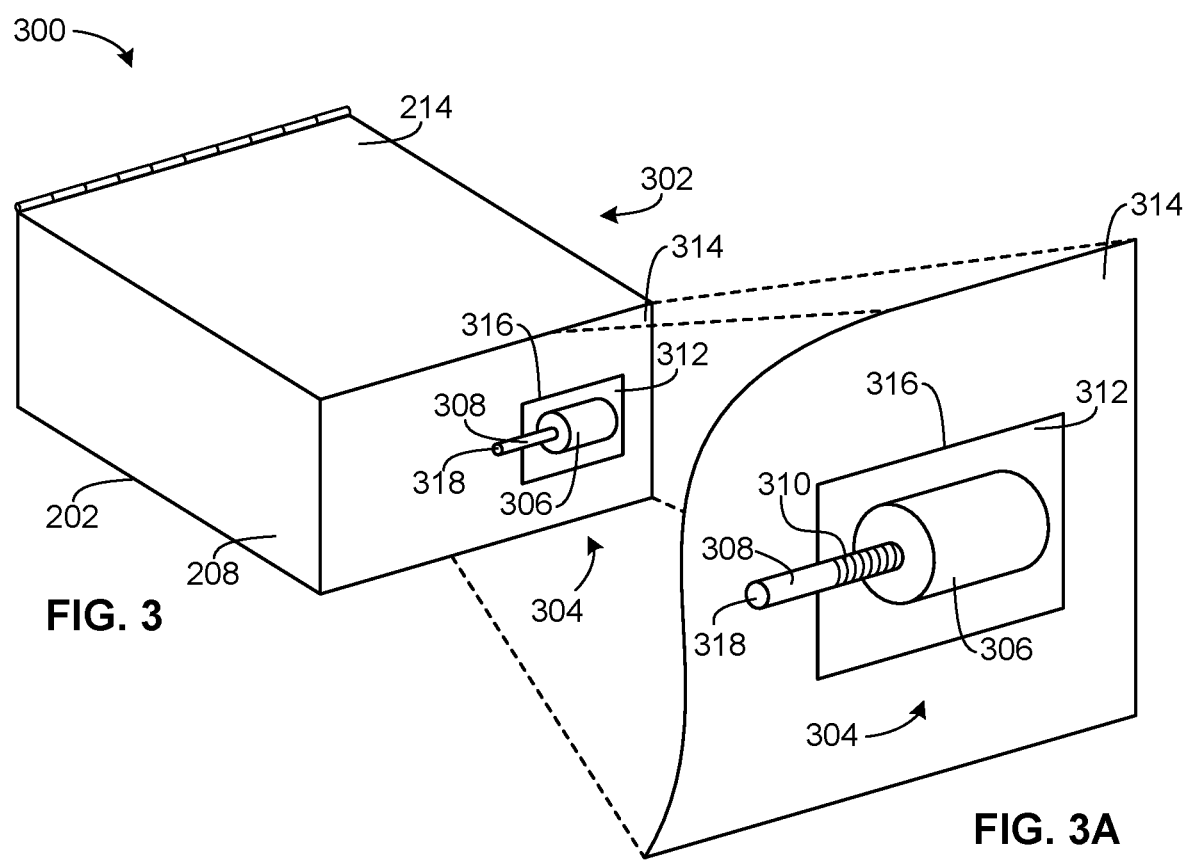
FIG. 3 is a perspective view of the example anti-crash module of FIGS. 1 and 2 shown in a non-deployed condition.

FIG. 3 is a perspective view of the first anti-crash module 118 of FIGS. 1 and 2 shown in a second or stored position 300 (e.g., a non-deployed position or non-activated). In the stored position 300, the compressible foam 204 of the illustrated example is compressed inside the cavity 212 (FIG. 2) of the base 208. In the compressed position, a volume of the compressible foam 204 is less than a volume of the compressible foam 204 when the compressible foam 204 is in the non-compressed state 206. The cover 214 is moved to the closed position 302 to maintain the compressible foam 204 in the compressed condition inside the cavity 212 of the enclosure 202 (e.g., the cover 214 pushes onto the compressed foam to maintain the compressible foam 204 inside the enclosure 202).

In the stored position 300, the compressible foam 204 may have stored energy to bias the cover 214 toward the open position 216. To maintain or retain the cover 214 in the closed position 302, the enclosure 202 of the illustrated example includes a lock 304. The lock 304 of the illustrated example moves between a first position to prevent the cover 214 from moving to the open position 216 and a second position to allow the cover 214 to move the open position 216. In the first position, the lock 304 of the illustrated example engages or latches to the cover 214 to prevent the cover 214 from moving the open position 216 and releases or disengages the cover 214 to allow the cover 214 to move to the open position 216. The lock 304 of the illustrated example may be implemented with many different configurations.

For example, the lock 304 of the illustrated example includes an actuator 306. In the illustrated example, the actuator is a solenoid. The actuator 306 of the illustrated example includes a shaft 308 and a spring 310 to provide a spring-loaded shaft that is movably coupled relative to the cover 214. In particular, the shaft 308 of the illustrated example is movable (e.g., rectilinearly) between a first position to engage the cover 214 and maintain the cover 214 in the closed position 302 and a second position to disengage the cover 214 to allow the cover 214 to move to the open position 216. The shaft 308 of the actuator 306 of the illustrated example pushes against the spring 310 and the shaft 308 is fully extended when power (e.g., DC voltage provided by a battery source) is removed from the actuator 306.

The actuator 306 of the illustrated example is coupled to the base 208 of the enclosure 202. In particular, the actuator 306 is coupled (e.g., fixed) to a front surface 312 of the base 208 (e.g., one of the walls 210 of the base 208). A surface 314 (e.g., a front wall, an outer surface) of the cover 214 of the illustrated example includes an opening 316 to receive the actuator 306. When the cover 214 is in the closed position 302, the opening 316 of the cover 214 receives the actuator 306. When power is not provided to the actuator 306 (e.g., when DC voltage is removed from the actuator 306), the spring 310 causes the shaft 308 to move to an extended position. The shaft 308 of the illustrated example can be pushed manually to position the cover 214 to the closed position 302 so that when the compressible foam 204 is compressed to the compressed state, the lock 304 can be placed without any power applied to the actuator 306 (e.g., without battery power). In a fully extended position as shown in FIG. 3, at least an end portion 318 of the shaft 308 engages the surface 314 of the cover 214 via the opening 316 to prevent the cover 214 from moving to the open position 216 (e.g., maintain the cover 214 in the closed position 302).

To move the cover 214 to the open position and deploy the compressible foam 204, power is applied to the actuator 306. When power (e.g., DC voltage or current) is applied to the actuator 306, the actuator 306 of the illustrated example moves the shaft 308 in direction away from the surface 314 of the cover 214 to cause the at least the end portion 318 of the shaft 308 to disengage or space from the surface 314 of the cover 214. For example, to unlock the cover 214 and allow the cover 214 to move relative to the base 208, the end portion 318 of the shaft 308 is positioned within the opening 316 of the cover 214 to release engagement with the cover 214.

In some examples, the lock 304 may include another any other suitable latch and actuator locking mechanism(s). In some examples, the lock 304 of the illustrated example includes an eyelet or opening (e.g., a U-shaped frame) that is attached or fixed to the surface 314 of the cover 214. For example, the cover 214 may include an eyelet that the shaft 308 engages to prevent the cover 214 from moving to the open position 216. When power is applied to the actuator 306, the actuator 306 of the illustrated example moves the shaft 308 out of engagement with the eyelet of the lock 304. In some examples, the lock 304 provides means for locking the cover 214 and the base 208. In some examples, the lock 304 provides means for preventing movement of the cover 214 relative to the base 208.

Figure 4:
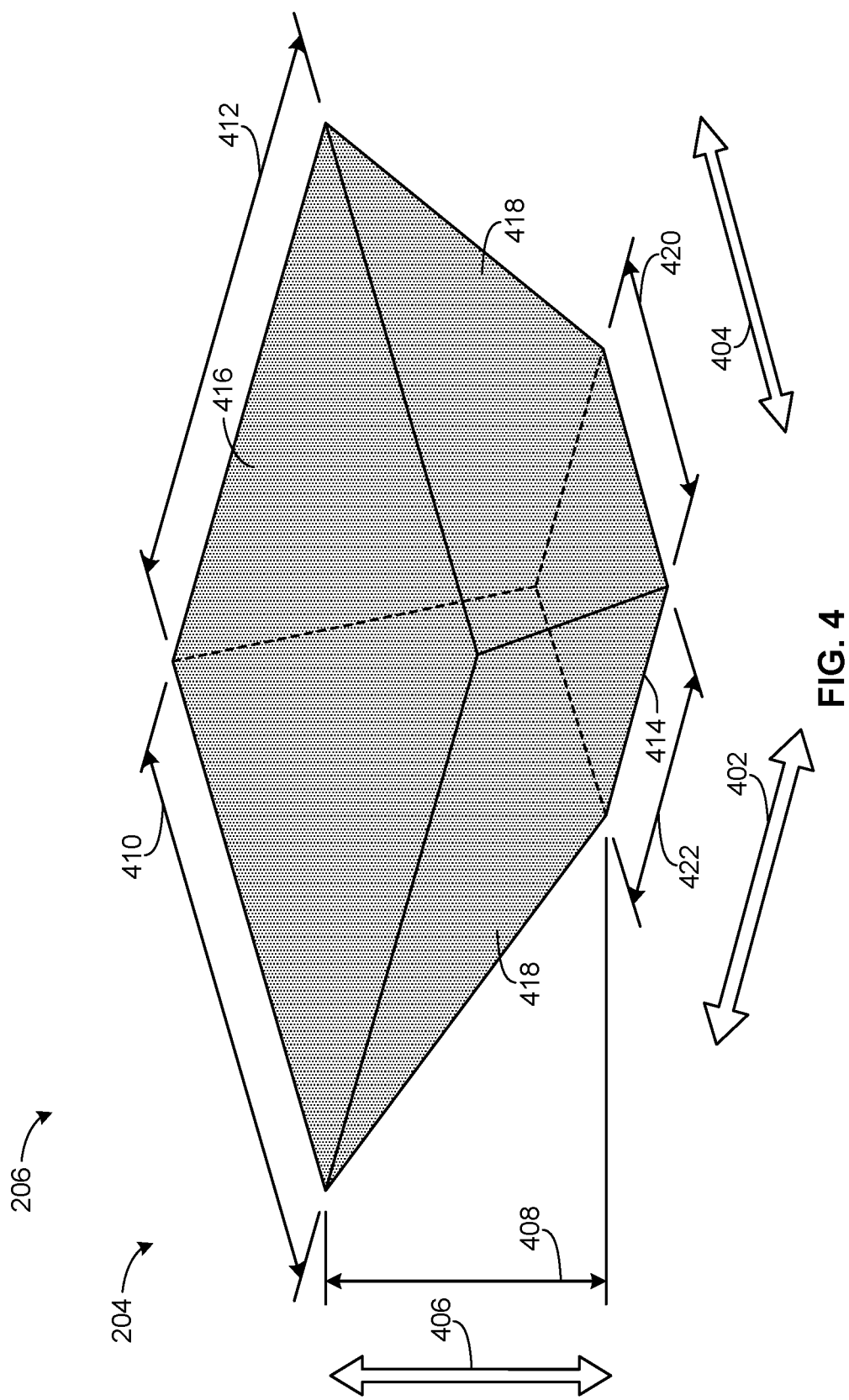
FIG. 4 is a perspective view of a compressible foam of the example anti-crash module of FIGS. 1-3.

FIG. 4 is a perspective view of the compressible foam 204 shown in the non-compressed state 206 (e.g., a deployed position, an activated position). The compressible foam 204 of the illustrated example is a sponge or foam. For example, the compressible foam 204 of the illustrated example is compressible in a first direction 402, a second direction 404 and a third direction 406. In the non-compressed state 206, a height 408, a length 410 and/or a width 412 of the compressible foam 204 may be larger than a height, a length and/or a width of the compressible foam 204 in the compressed state. The compressible foam 204 of the illustrated example may be composed of, polystyrene (EPS), ployethylene, polyurethan foam, and/or any other suitable material(s). For example, compressible foam 204 of the illustrated example has density range of approximately between 18 and 35, an indentation load deflection of approximately between 18 and 45, and a recovery time of approximately between 5 seconds and 1 minute.

As used herein, for example, the density of the compressible foam 204 describes a ratio of urethane chemical to air in a composition. For example, a density of 18 means 1.8 pounds of chemical is used per cubic feet of the foam. As the density gets smaller, a softness characteristic of the compressible foam 204 increases. In some examples, the compressible foam 204 of the illustrated example includes softer foam characteristics to provide a high compression ratio.

As used herein, indentation load deflection (ILD) is a measure of how much pressure is needed to compress the compressible foam by 25% of a thickness of the compressible foam (e.g., 25% of the height). For example, if the ILD for a compressible foam with a 10-centimeter thickness is given as 11, this means that 11 pounds of force is needed to reduce the thickness to 7.5 centimeters. The compressible foam 204 of the illustrated example has a relatively low ILD value (e.g., between approximately 18 and 45).

As used herein, recover time means an amount of time needed for the compressible foam 204 to return to the non-compressed state 206 (e.g., an initial position, an original shape, etc.) after being compressed to the compressed state. To have a relatively fast recovery time, air should be able to leave and enter the foam as quickly as possible. The speed of air movement in and out of the compressible foam 204 is a function of a cell structure of the compressible foam 204. If the compressible foam 204 has a closed cell structure, air movement is slower, making the recovery slow. Thus, the compressible foam 204 of the illustrated example includes an open cell structure. As an example, flexible polyurethane foams have an open cell structure and almost immediately return to the original shape. The compressible foam 204 of the illustrated example may have an open cell structure that allows recovery to the non-compressed state 206 between approximately 5 seconds and 1 minute.

The compressible foam 204 of the illustrated example includes a base surface 414, an impact surface 416, and side surfaces 418 extending between the impact surface 416 and the base surface 414. The side surfaces 418 of the illustrated example have tapered or angled profile between the impact surface 416 and the base surface 414. In particular, the side surfaces 418 flare outwardly from the base surface 414 toward the impact surface 416. The side surfaces 418 having a tapered profile help provide clearance of components of the UAV 100 during deployment and/or facilitate moving (e.g., squeezing) the compressible foam 204 of the illustrated example to the compressed state when positioning in the cavity 212 of the enclosure 202

Figure 5:
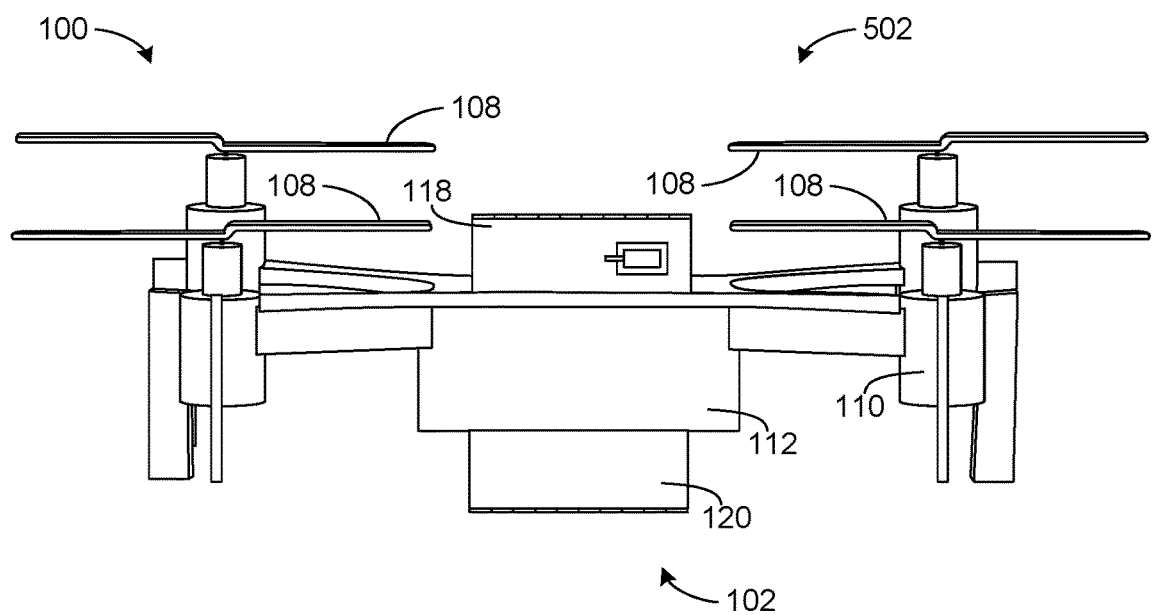
FIG. 5 is a front view of the example unmanned vehicle of FIG. 1.

The compressible foam 204 of the illustrated example is formed as a polyhedron in the shape of a truncated pyramid. For example, the base surface 414 of the compressible foam 204 has a dimensional envelope (e.g., a length 420 and a width 422) that is smaller than a dimensional envelope (e.g., a length 410 and a width 412) of the impact surface 416 when the compressible foam 204 is in the non-compressed state 206. For example, in the non-compressed state 206, the impact surface 416 of the compressible foam 204 of the illustrated example has a surface area that is greater than a surface area of the base surface 414. Further, the impact surface 416 of the illustrated example has a substantially flat or planar profile. In this manner, the compressible foam 204 of the illustrated example provides air resistance (e.g., an air brake effect) during free fall and/or covers a substantial amount of area of the housing 112 of the UAV 100. For example, providing the impact surface 416 with a dimensional footprint that is larger than a footprint of the base surface 414 increases (e.g., maximizes) air resistance during a free fall, and the smaller footprint of the base surface 414 facilitates attachment to the bottom surface of the enclosure 202 as shown in FIG. 2. In some examples, the compressible foam 204 may include any other shape or configuration FIG. 5 is a front view of the UAV 100 of FIG. 1 showing the safety system 102 in a non-deployed position 500. In the non-deployed position 500, the cover 214 of the first anti-crash module 118 and the cover 214 of the second anti-crash module 120 are in the closed positions 302, respectively. In other words, the compressible foam 204 of the first anti-crash module 118 and the compressible foam 204 of the second anti-crash module 120 are not exposed (e.g., are in the compressed states positioned inside the cavities 212 of the respective bases 208). The first anti-crash module 118 and the second anti-crash module 120 of the illustrated do not interfere with the operation of the UAV 100 (e.g., the propellers 108).

The safety system 102 of the illustrated example is the non-deployed position 500 when the UAV 100 is in normal operation. Normal operation as used herein means that the UAV 100 can maneuver along a desired or commanded trajectory, the motors 110 of the UAV 100 are operational, the propellers 108 of the UAV 100 can generate lift when rotated, a controller of the UAV 100 is in a non-fail state, a communication link between the UAV 100 and a control center or remote control is active, and/or the UAV 100 is not in a free fall or in imminent risk of crashing or impacting an object or the ground.

Figure 6A:
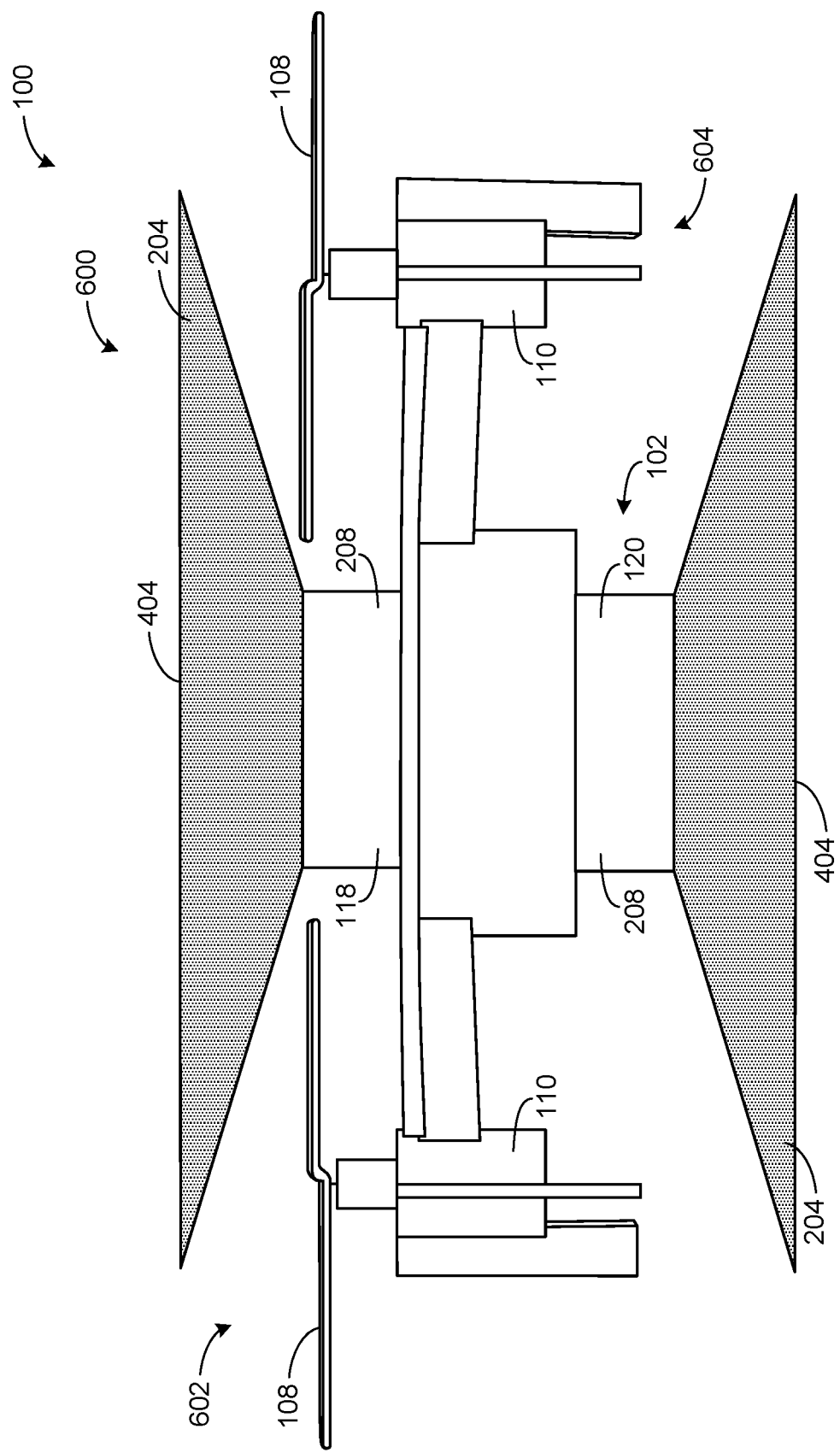
FIG. 6A is a front view of the example unmanned vehicle of FIGS. 1 and 2 showing the example safety system in a deployed condition.
Figure 6B:
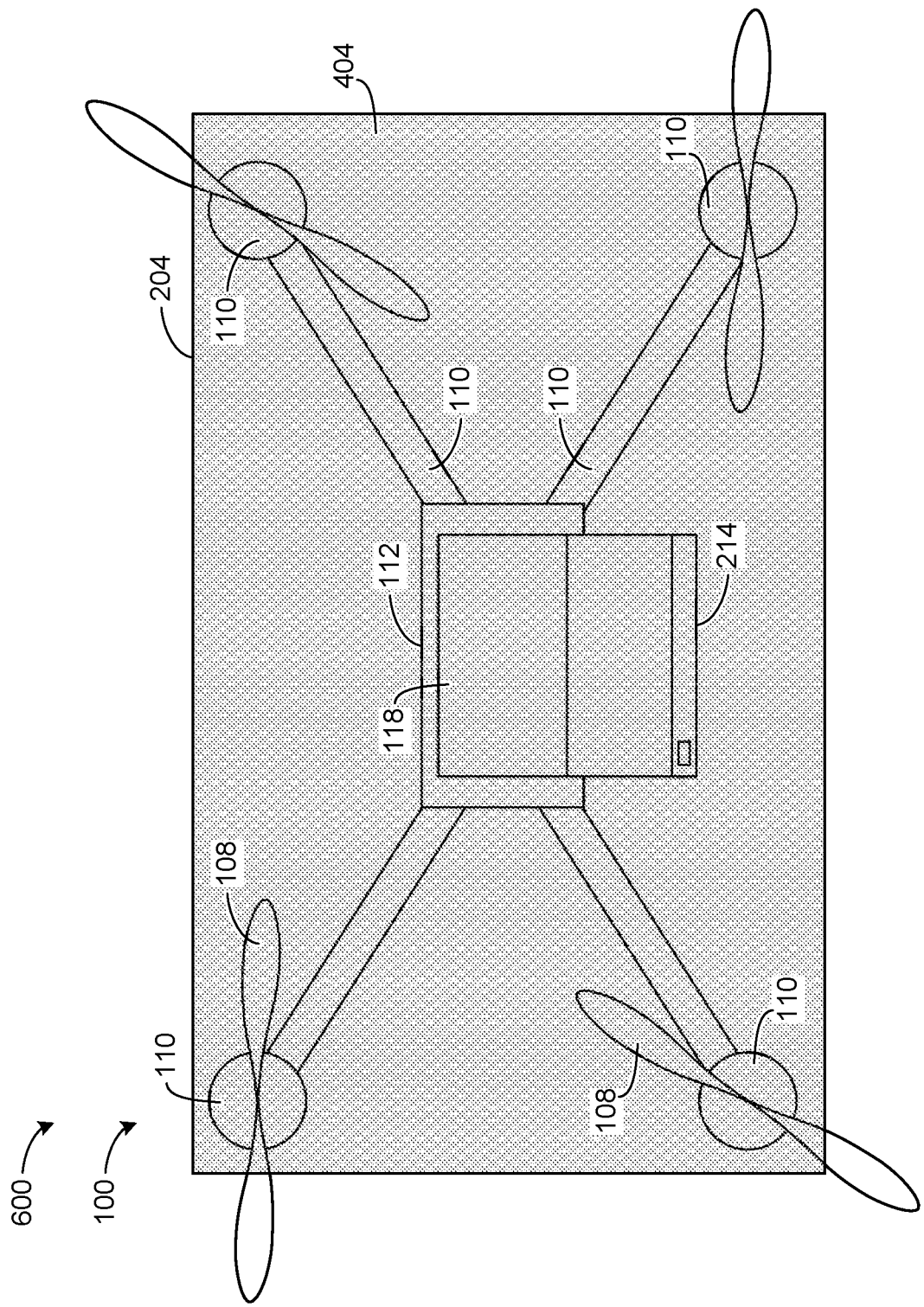
FIG. 6B is a top view of the example unmanned vehicle of FIG. 6A.

FIG. 6A illustrates a front view of the UAV 100 of FIGS. 1 and 5 showing the safety system 102 in a deployed position 600. FIG. 6B is a top view of the UAV 100 of FIG. 6A. The safety system 102 of the illustrated example is the deployed position 600 when the UAV 100 is in a fail state or condition. A fail-state condition as used herein means that the UAV 100 cannot maneuver along a desired or commanded trajectory, the motors 110 of the UAV are non-operational or not functional, the propellers 108 of the UAV 100 cannot generate lift when rotated (e.g., are bent), a controller of the UAV 100 is in a fail state, a communication link between the UAV 100 and a control center or remote control is unavailable or broken, and/or the UAV 100 is in a free fall or in imminent risk of crashing or impacting an object or the ground.

In the deployed position 600, the compressible foam 204 of the first anti-crash module 118 and the compressible foam 204 of the second anti-crash module 120 are in the non-compressed states 206 and project or extend from the respective bases 208. The compressible foam 204 of the first and second anti-crash modules 118 and 120 absorb forces and/or otherwise reduce or prevent damage to the UAV 100 during impact or a collision.

To deploy the safety system 102, the locks 304 of the first and second anti-crash modules 118 and 120 of the illustrated example are moved to the unlock positions to enable the covers 214 of the first anti-crash module 118 and the second anti-crash module 120 to move to the open positions 216, respectively. For example, power is provided to the actuators 306 of the first anti-crash module 118 and the second anti-crash module 120. In some examples, the actuators 306 may be triggered synchronously to cause simultaneous deployment of the compressible foam 204 of the first anti-crash module 118 and the compressible foam 204 of the second anti-crash module 120.

In the deployed position 600, the compressible foam 204 projects from the base 208 of the first anti-crash module 118 and the compressible foam 204 projects from the base 208 of the second anti-crash module 120. For example, in the deployed position 600, the compressible foam 204 of the first anti-crash module 118 at least partially extends over the housing 112, the propellers 108 and/or the motors 110 of the UAV 100. More specifically, the compressible foam 204 of the first anti-crash module 118 of the illustrated example extends across a first side 602 (e.g., an upper side of the UAV 100 in the orientation of FIG. 6A). Similarly, the compressible foam 204 of the second anti-crash module 120 at least partially extends over the housing 112, the motors 110 and/or the landing gear 116 of the UAV 100. More specifically, the compressible foam 204 of the second anti-crash module 120 of the illustrated example extends across a second side 604 (e.g., a lower side of the UAV 100 in the orientation of FIG. 6A) opposite the first side 602. Thus, the compressible foam 204 of the first anti-crash module 118 protects upper surfaces of the housing 112 and/or motors 110 and the compressible foam 204 of the second anti-crash module 120 protects lower surfaces of the housing 112 and/or motors 110 during an accident or crash.

Thus, the compressible foam 204 of the first and second anti-crash modules 118 and 120 of the illustrated example extend to cover an area sufficient to at least cover the housing 112 (e.g., including the motors 110) of the UAV 100 entirely when deployed just before a crash or impact. In some examples, the dimensional characteristics of the compressible foam 204 can be varied (e.g., increased or decreased) to protect more expensive components of the UAV 100 (e.g., the body, a camera and the motors, etc.). In some examples, the propellers 108 are less expensive components that may not be protected by the compressible foam 204 of the first anti-crash module 118.

The impact surface 416 of the compressible foam 204 of the first anti-crash module 118 and/or the second anti-crash module 120 absorbs an impact or forces during a crash or impact to prevent or significantly reduce damage to the UAV 100. Additionally, the impact surface 416 may provide air brake effect during a free fall condition. For example, the compressible foam 204 of the illustrated example provides an air brake effect to slow a speed of the UAV 100 due to the surface area and/or substantially planar shape of the impact surface 416. For example, during a free fall condition, the compressible foam 204 of the illustrated example increases air resistance, thereby providing an air brake to slow the speed of the UAV 100 so that the UAV 100 hits the ground at a slower speed, thereby reducing (e.g., minimizing) physical damage to the UAV 100 that may be caused by an impact. In other words, the UAV 100 is not only protected by the flexibility of the compressible foam 204 surrounding the housing 112, but also by the air brake effect provided by the impact surface 416 during a free fall condition. In some examples, the compressible foam 204 provides means for protecting the lift generating means from impact. In some examples, the compressible foam 204 provides means for absorbing an impact. In some examples, the compressible foam 204 provides means for providing an air brake.

The compressible foam 204 of the first anti-crash module 118 of the illustrated example is identical to the compressible foam 204 of the second anti-crash module 120. In some examples, the first anti-crash module 118 (e.g., the base 208, the cover 214, the compressible foam 204) may be different than the second anti-crash module 120 (e.g., the base 208, the cover 214, the compressible foam 204). For example, in some examples, the compressible foam 204, the base 208 and/or the cover 214 of the first anti-crash module 118 may have a different (e.g., a larger) dimensional envelope or footprint compared to a dimensional envelope or footprint of the compressible foam 204, the base 208 and/or the cover 214 of the second anti-crash module 120. In some examples, the compressible foam 204 of the first anti-crash module 118 may have a different (e.g., larger or smaller) density, indentation load deflection and/or response time compared to the density, indentation load deflection and/or response time of the compressible foam 204 of the second anti-crash module 120. In some examples, the compressible foam 204 of the first anti-crash module 118 may be composed of a different material compared to a material of the compressible foam 204 of the second anti-crash module 120. In some examples, one or more side surfaces (e.g., between the first surface 222 and the second surface 224) of the UAV 100 of the illustrated example may include anti-crash modules. In some examples, one or more arms 114 of the UAV 100 of the illustrated example may include one or more anti-crash modules.

Figure 7:
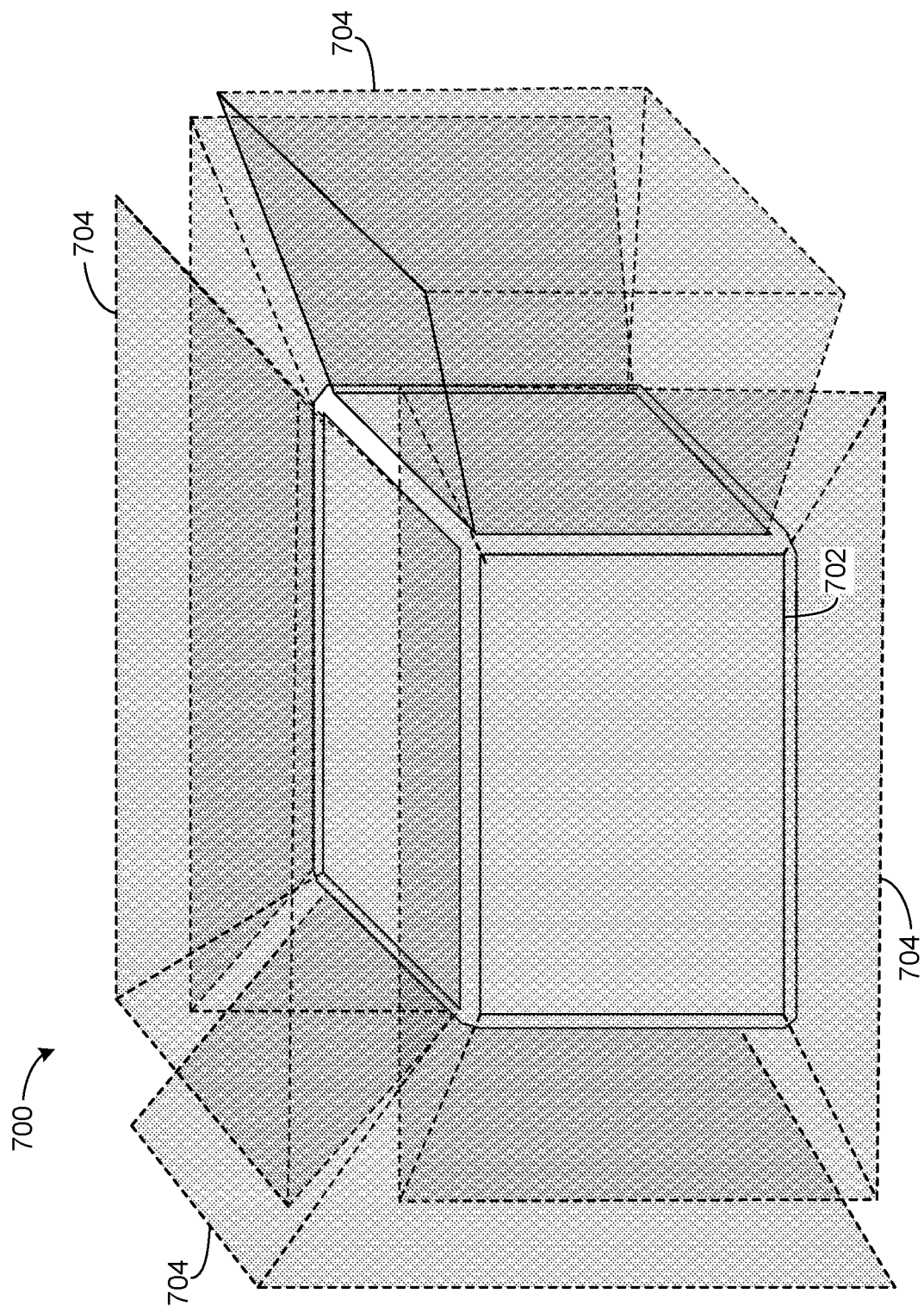
FIG. 7 is a schematic illustration of an example unmanned vehicle and an example safety system disclosed herein.

FIG. 7 is a schematic illustration of another example UAV 700 disclosed herein. The UAV 700 of the illustrated example includes a housing 702 having an anti-crash module 704 on each side of the housing 702. In this manner, the anti-crash module 704 can protect each surface of the sides of the UAV 700 on which the anti-crash module 704 is provided. A propulsion system (e.g., propellers and motors) of the UAV 700 is not shown for clarity. For example, the housing 702 of the UAV of the illustrated example has a rectangular prism or shape. When an anti-crash module 704 of the illustrated example is installed to each side of the prism (e.g., a top surface, a bottom surface, a left surface, a right surface, a front surface, a rear surface), full protection can be ensured from all six sides of the UAV 700. In some examples, to accommodate different surfaces of a housing of an UAV (e.g., depending on a morphology or shape of an UAV), besides a number of anti-crash modules used, a size of each anti-crash module may also be different.

Figure 8:
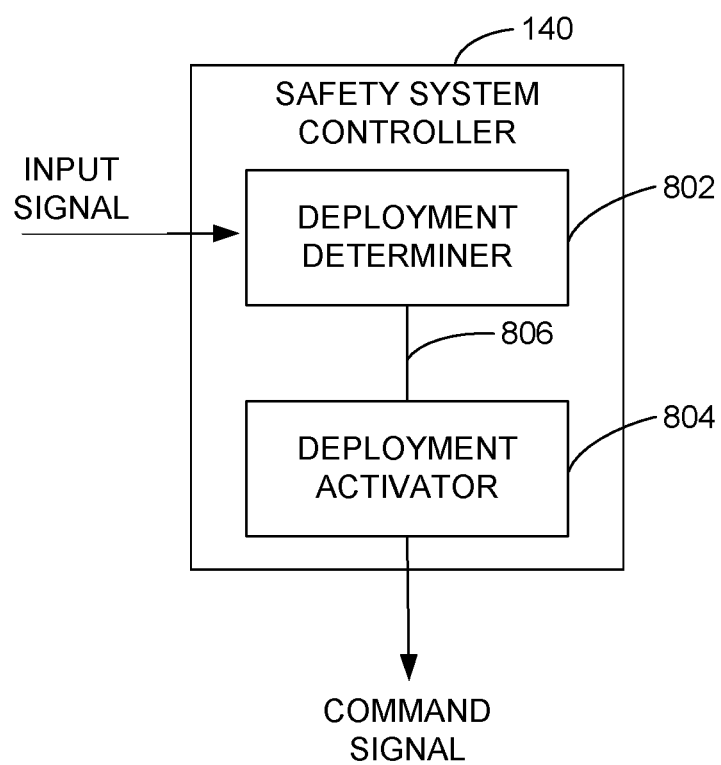
FIG. 8 is a block diagram of an example processor constructed in accordance with the teachings of this disclosure that may implement example safety system controller disclosed herein.

FIG. 8 is a block diagram of an example processor constructed in accordance with the teachings of this disclosure that may implement the example safety system controller 140 of the example vehicles disclosed herein. The safety system controller 140 of the illustrated example includes a deployment determiner 802 and a deployment activator 804 that are communicatively coupled via an example communication bus 806.

The safety system controller 140 of the illustrated example may employ the vehicle controller 130 to control deployment of the safety system 102. For example, the deployment determiner 802 of the illustrated example receives, obtains and/or retrieves a command or signal from the vehicle controller 130 to activate the safety system 102. For example, the deployment determiner 802 of the illustrated example may be communicatively coupled to the vehicle controller 130 via, for example, a wired connection, a wireless connection, etc. In some such examples, the deployment determiner 802 may include a signal receiver that receives a signal or communication from the vehicle controller 130. For example, the vehicle controller 130 receives one or more feedback signals from the one or more sensors of the UAV 100 to determine if the UAV 100 is in a normal operating condition, a fail mode and/or determine a potential collision.

In some examples, the safety system controller 140 of the illustrated example may operate independently from the vehicle controller 130 to activate or deploy the safety system 102. In some such examples, the safety system controller 140 and/or the deployment determiner 802 may include a sensor interface to receive, obtain and/or otherwise retrieve feedback signals from one or more sensors of the UAV 100 to determine if the UAV 100 is in a normal operating condition, a fail mode and/or determine a potential collision. In some examples, the deployment determiner 802 provides means for receiving input signals.

To determine an operating state of the UAV 100, the vehicle controller 130 and/or the safety system controller 140 may receive feedback signals from the orientation sensor(s) 134, the position sensor(s) 136, the proximity sensor(s) 138, a camera, etc. The feedback signal(s) of the sensors can represent a binary value (e.g., on/off), a digital value, an analog value, an image and/or a video. In some examples, the feedback signal(s) may be a voltage signal (e.g., a direct current voltage value) that, when compared to a sensor device look-up table (reference) reveals a corresponding physical state (e.g., a distance in centimeters, etc.).

For example, the vehicle controller 130 and/or the safety system controller 140 may activate the safety system 102 when the vehicle controller 130 and/or the safety system controller 140 detects that the UAV 100 is in a non-operating condition and/or detects a potential collision between the UAV 100 and another object.

For example, the vehicle controller 130 and/or the safety system controller 140 may determine that the UAV 100 is in a non-operating condition when the UAV 100 is not following a trajectory path, the motors 110 and/or the propellers are non-functional to generate lift, a battery of the UAV 100 is depleted, the UAV 100 is in a free fall condition, and/or the UAV 100 may colloid with an object. For example, if the vehicle controller 130 and/or the safety system controller 140 determines that the attitude or position of the UAV 100 is outside a threshold, the vehicle controller 130 and/or the safety system controller 140 may determine that the UAV 100 is in a non-operating or fail condition. In some examples, the vehicle controller 130 and/or the safety system controller 140 may activate the safety system when the vehicle controller 130 and/or the safety system controller 140 determines that a proximity of the UAV 100 relative to the external object is less than a proximity threshold.

The deployment determiner 802 commands or communicates a signal to the deployment activator 804 to deploy or activate the safety system 102. For example, the deployment activator 804 may activate or position a switch operatively coupled to the actuator 306. For example, the actuator 306 may be triggered by a switch that closes a circuit between a battery of the UAV 100 and the actuator 306. The deployment activator 804 may cause the switch to move to a first position to open or short the circuit between the battery and the actuator 306 when the deployment determiner 802 determines that the safety system 102 is not to be deployed (e.g., when the safety system 102 is in the non-deployed position 500). The deployment activator 804 of the illustrated example may cause the switch to move a second position to close the circuit between the battery and the actuator 306 when the deployment determiner 802 determines that the safety system 102 is to be deployed (e.g., when the safety system 102 is in the deployed position 600). The switch may be a transistor such as, for example, a metal oxide semiconductor field effect transistor (MOSFET), a negative metal oxide semiconductor (NMOS), a positive metal oxide semiconductor (PMOS), a complementary metal oxide semiconductor (CMOS) made from PMOS and NMOS transistors, a relay, a mechanical switch, and/or any other switches or device(s) (e.g., electrical or mechanical) to electrically couple or decouple a power source and the actuator 306.

For example, when the vehicle controller 130, the safety system controller 140 and/or the deployment determiner 802, via the position sensor(s) 136 or orientation sensor(s) 134, detects a free fall condition, the deployment activator 804 may cause the switch to close the circuit between the battery and the actuator 306. In some examples, when the vehicle controller 130, the safety system controller 140 and/or the deployment determiner 802, via the one or more proximity sensor(s) 138, detects an imminent crash or potential collision condition, the deployment activator 804 may close the circuit to activate the safety system 102. When the vehicle controller 130, the safety system controller 140 and/or the deployment determiner 802 does not detect an imminent crash or a free fall condition, the deployment activator 804 causes the switch to open or short the circuit between the battery and the actuator 306. In some examples, the deployment activator 804 provides means for deploying the safety system 102. In some examples, the deployment activator 804 provides means for coupling a power source and the actuator 306.

While an example manner of implementing the safety system controller of FIG. 1 is illustrated in FIG. 8, one or more of the elements, processes and/or devices illustrated in FIG. 8 may be combined, divided, re-arranged, omitted, eliminated and/or implemented in any other way. Further, the example deployment determiner 802, the example deployment activator 804 and/or, more generally, the example safety system controller 140 of FIG. 8 may be implemented by hardware, software, firmware and/or any combination of hardware, software and/or firmware. Thus, for example, any of the example deployment determiner 802, the example deployment activator 804 and/or, more generally, the example safety system controller 140 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example deployment determiner 802, the deployment activator 804 and/or, more generally, the example safety system controller 140 is/are hereby expressly defined to include a non-transitory computer readable storage device or storage disk such as a memory, a digital versatile disk (DVD), a compact disk (CD), a Blu-ray disk, etc. including the software and/or firmware. Further still, the example safety system controller 140 of FIG. 8 may include one or more elements, processes and/or devices in addition to, or instead of, those illustrated in FIG. 8, and/or may include more than one of any or all of the illustrated elements, processes and devices.

Figure 9:
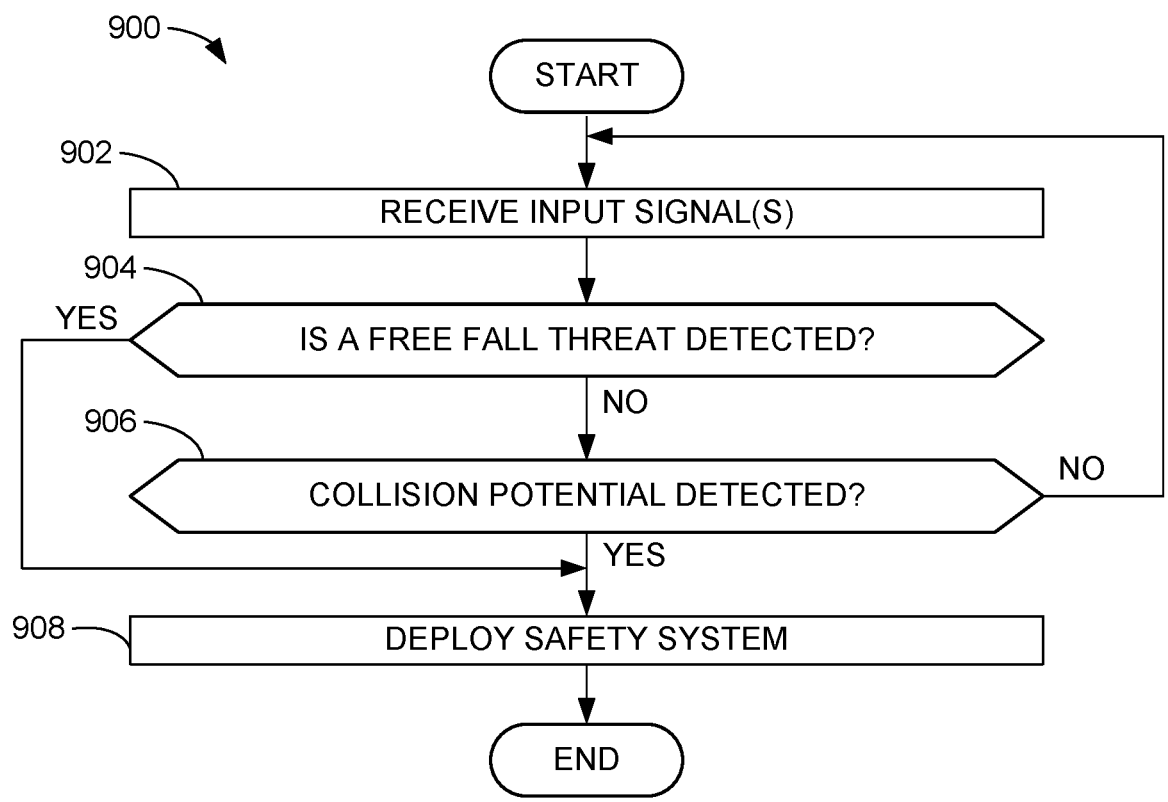
FIG. 9 is a flowchart representative of example machine readable instructions that may be executed to implement example safety system controller disclosed herein.

A flowchart representative of example machine readable instructions for implementing the safety system controller 140 of FIG. 8 is shown in FIG. 9. In this example, the machine readable instructions comprise a program for execution by a processor such as the processor 1112 shown in the example processor platform 1100 discussed below in connection with FIG. 11. The program may be embodied in software stored on a non-transitory computer readable storage medium such as a CD-ROM, a floppy disk, a hard drive, a digital versatile disk (DVD), a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowchart illustrated in FIG. 9, many other methods of implementing the example safety system controller 140 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIG. 9 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

The program of FIG. 9 begins at block 902 when the deployment determiner 802 receives an input signal (block 902). In some examples, the deployment determiner 802 may receive a signal from the vehicle controller 130. In some examples, the deployment determiner 802 may include a sensor interface to receive signals from the orientation sensor(s) 134, the position sensor(s) 136, the proximity sensor(s) 138 and/or any other sensor of the UAV 100. The deployment determiner 802 employs the input signal(s) to determine whether to deploy the safety system 102.

The deployment determiner 802 determines if the UAV 100 is in a free fall risk, threat or condition based on the received input signal(s) (block 904). In some examples, the deployment determiner 802 receives a signal from the vehicle controller 130 indicative of the UAV 100 being in a free fall condition. In some examples, the deployment determiner 802 receives feedback signals from the orientation sensor(s) 134 and/or the position sensor(s) 136 do determine if the UAV 100 is in a free fall condition. For example, the deployment determiner 802 may determine that the UAV 100 is in a free fall condition if the feedback signals from the orientation sensor(s) 134 and/or the position sensor(s) 136 are outside an acceptable operating range and may determine that the UAV 100 is not in a free fall condition if the feedback signals from the orientation sensor(s) 134 and/or the position sensor(s) 136 are within an acceptable operating range.

If a free fall threat is not detected at block 904, the deployment determiner determines if collision potential is detected (block 906). In some examples, the deployment determiner 802 receives a signal from the vehicle controller 130 indicative of a detected collision potential. In some examples, the deployment determiner 802 receives feedback signals from the proximity sensor(s) to detect a potential collision of the UAV 100. For example, the deployment determiner 802 may detect a potential collision when a feedback signal from the proximity sensor(s) 138 is less than a proximity threshold and may not detect a potential collision when a feedback signal from the proximity sensor(s) 138 is greater than the proximity threshold.

If the deployment determiner 802 does not detect a collision potential at block 906, the process 900 returns to block 902. In some examples, if the deployment determiner 802 does not detect a free fall condition at block 904 or a collision potential at block 906, the deployment activator 804 may cause a circuit between a battery and the actuator 306 to short (or remain open).

If the deployment determiner 802 detects a free fall condition at block 904 or a collision potential at block 906, the deployment activator 804 deploys the safety system 102 (block 908). For example, to deploy the safety system 102, the deployment activator 804 closes a circuit between a battery and the actuator 306 of the first anti-crash system 118 and the second anti-crash system 120. The deployment activator 804 may deploy the first anti-crash system 118 and the second anti-crash system 120 simultaneously or synchronously. In some examples, the deployment activator 804 may deploy the first anti-crash system 118 and the second anti-crash system 120 asynchronously. In some examples, the deployment activator 804 may deploy only one of the first anti-crash system 118 or the second anti-crash system 120 depending on an orientation of the UAV 100.

Figure 10:
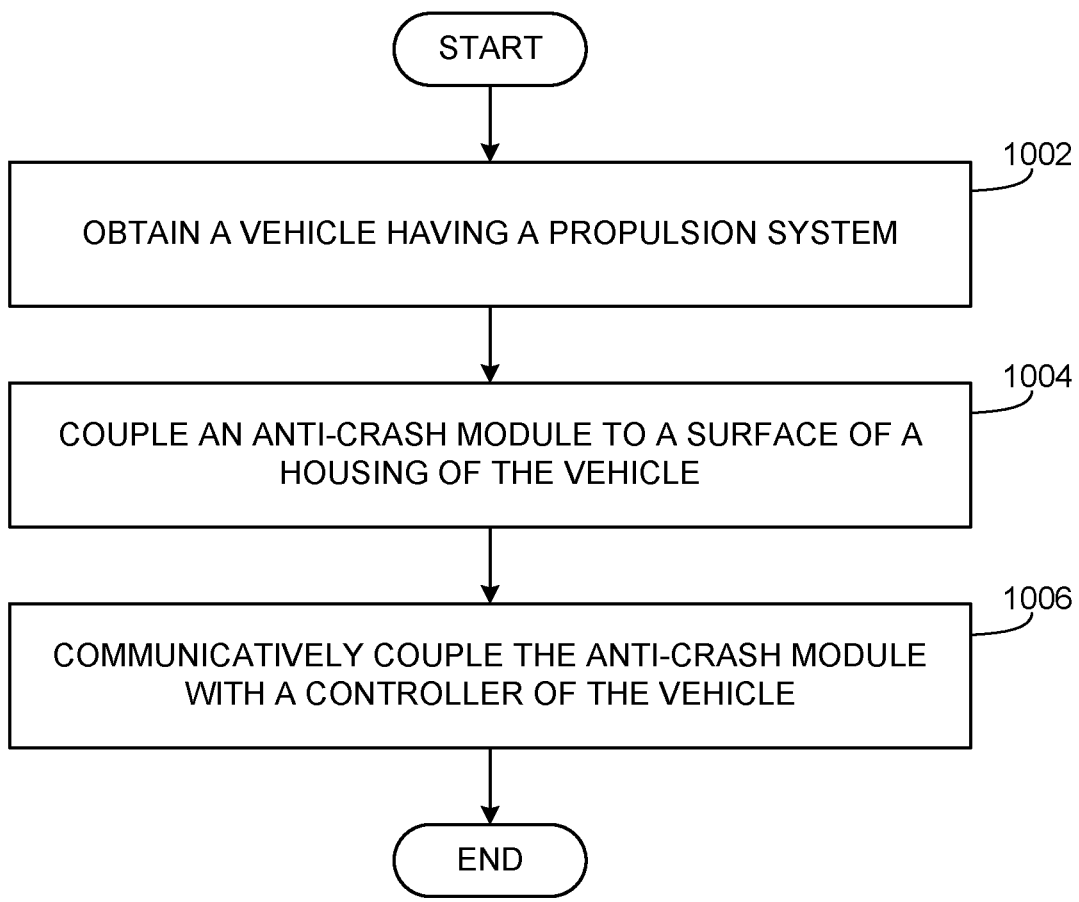
FIG. 10 is a flowchart of an example method to manufacture an example unmanned vehicle disclosed herein.

FIG. 10 is a flowchart of an example method 1000 to manufacture an example UAV 100, 700 disclosed herein. While an example manner of assembling the example UAV 100, 700 has been illustrated in FIG. 10, one or more of the steps and/or processes illustrated in FIG. 10 may be combined, divided, re-arranged, omitted, eliminated and/or implemented in any other way. Further still, the example method of FIG. 10 may include one or more processes and/or steps in addition to, or instead of, those illustrated in FIG. 10, and/or may include more than one of any or all of the illustrated processes and/or steps. Further, although the example method is described with reference to the flow chart illustrated in FIG. 10, many other methods of assembling the UAV 100, 700 may alternatively be used.

To begin the example assembly process of FIG. 10, a vehicle having a propulsion system is obtained (block 1002). The UAV 100, 700 may include the housing 112, 702 that is formed during assembly. In some examples, the housing 112, 702 may be prefabricated or preassembled and/or may be an existing unmanned vehicle (e.g., an off the self-part, retrieved from a warehouse, etc.). An anti-crash module 118, 120, 704 is then attached to the housing 112, 702 (block 1004). For example, the anti-crash module 118, 120, 704 may be fastened to the housing 112, 702 of the UAV 100, 700 via fasteners. In some examples, the anti-crash module 118, 120, 704 may retrofit an existing unmanned vehicle. For example, the anti-crash module 118, 120, 704 of the illustrated example may be manufactured as a kit for retrofitting UAVs. For example, the anti-crash modules 118, 120, 704 may be coupled to surfaces of a housing of an existing UAV via, for example, chemical fastener(s) (e.g., adhesive), mechanical fastener(s) (e.g., screws, rivets, etc.) and/or any other fastener(s). The anti-crash module 118, 120, 704 may be communicatively coupled to a controller of the UAV 100, 700. (block 1006). For example, the actuator 306 of the anti-crash module 118, 120, 704 may be communicatively coupled (e.g., via wireless or wired) to a controller of the UAV 100, 700 and/or a remote controller of the UAV 100, 700.

Figure 11:
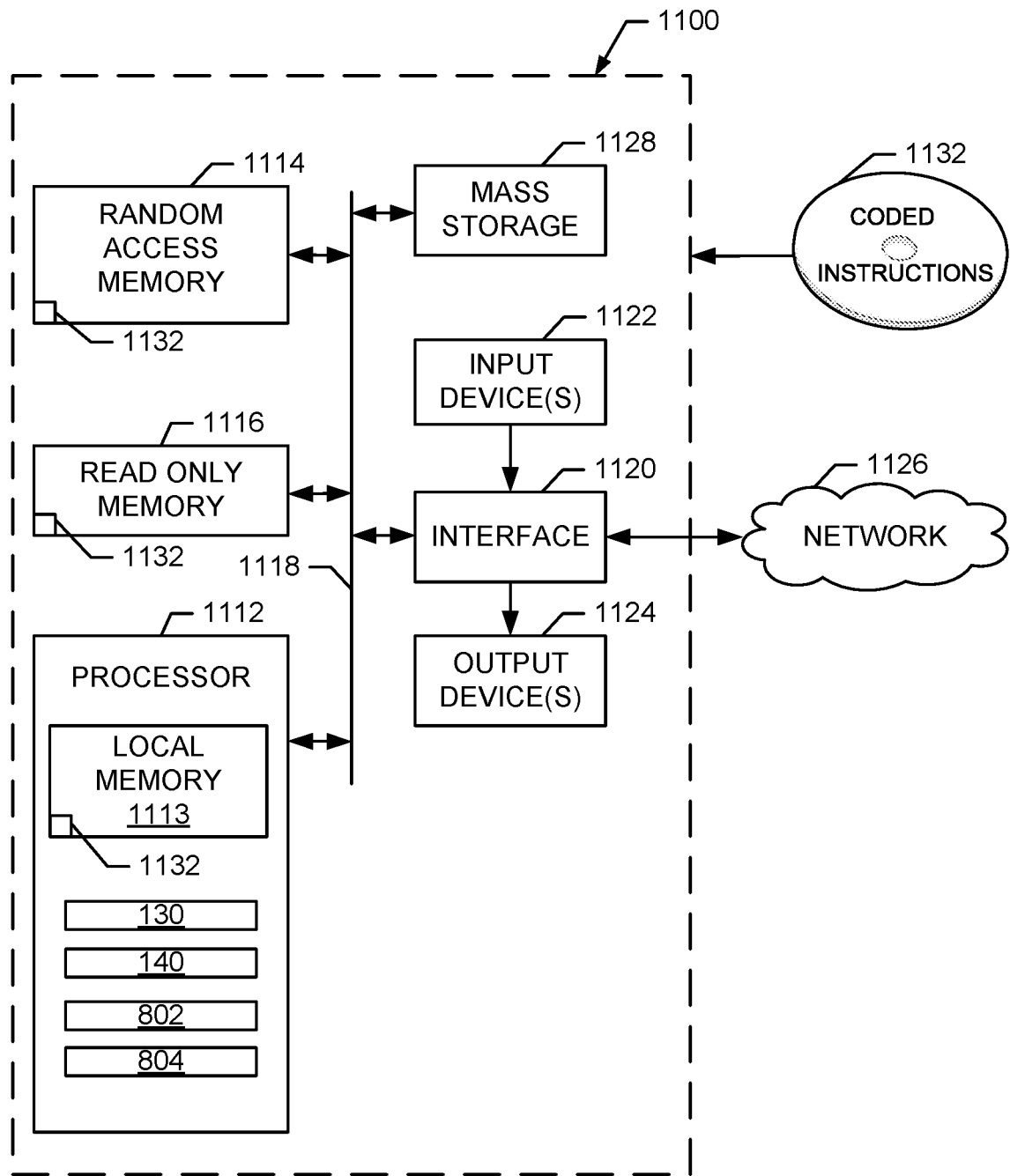
FIG. 11 is a schematic illustration of an example processor processing platform that may execute the instructions of FIG. 9 to implement the example safety system controller of FIG. 8.

FIG. 11 is a block diagram of an example processor platform 1100 capable of executing the instructions of FIG. 9 to implement the safety system controller 140 of FIG. 8. The processor platform 1100 can be, for example, a server, a personal computer, a mobile device (e.g., a cell phone, a smart phone, a tablet such as an iPad™), a personal digital assistant (PDA), an Internet appliance, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer. The hardware processor may be a semiconductor based (e.g., silicon based) device. In this example, the processor implements the deployment determiner 802 and deployment activator 804.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), and/or a PCI express interface.

In the illustrated example, one or more input devices 1122 are connected to the interface circuit 1120. The input device(s) 1122 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1120 of the illustrated example, thus, typically includes a graphics driver card, a graphics driver chip and/or a graphics driver processor.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a digital subscriber line (DSL), a telephone line, coaxial cable, a cellular telephone system, etc.).

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, RAID systems, and digital versatile disk (DVD) drives.

The coded instructions 1132 of FIG. 9 may be stored in the mass storage device 1128, in the volatile memory 1114, in the non-volatile memory 1116, and/or on a removable tangible computer readable storage medium such as a CD or DVD.

Example unmanned vehicles are disclosed. Further examples and combinations thereof include the following.

Example 1 may be an unmanned vehicle including a housing and a propulsion system supported by the housing, where the propulsion system is to generate lift. An anti-crash module is coupled to the housing. The anti-crash module has a compressible foam that is to deploy to protect the propulsion system from an impact.

Example 2 includes the unmanned vehicle of example 1, wherein the anti-crash module includes a base and a cover movably coupled relative to the base.

Example 3 includes the unmanned vehicle of any one of examples 1-2, wherein the base defines a cavity to receive the compressible foam.

Example 4 includes the unmanned vehicle of any one of examples 1-3, wherein the cover is positioned over the cavity when the cover is in a closed position relative to the base.

Example 5 includes the unmanned vehicle of any one of examples 1-4, wherein the compressible foam is in a compressed state when stored in the cavity and the cover is positioned over the cavity.

Example 6 includes the unmanned vehicle of any one of examples 1-5, further comprising a lock to maintain the cover in the closed position.

Example 7 includes the unmanned vehicle of any one of examples 1-6, wherein lock includes a solenoid having a spring-loaded shaft.

Example 8 includes the unmanned vehicle of any one of examples 1-7, wherein the solenoid is to couple to a front surface of the base.

Example 9 includes the unmanned vehicle of any one of examples 1-8, wherein the cover includes an opening to receive the solenoid when the cover is in the closed position to enable the shaft of the solenoid to extend from the solenoid and engage a front surface of the cover.

Example 10 includes the unmanned vehicle of any one of examples 1-9, wherein, wherein the solenoid moves the shaft away from the front surface of the cover to move the cover to an open position and deploy the compressible foam from the base.

Example 11 includes the unmanned vehicle of any one of examples 1-10, further including wherein the compressible foam has a density of between approximately between 1.8 pounds and 3.5 pounds of chemical used per cubic feet of the compressible foam.

Example 12 includes the unmanned vehicle of any one of examples 1-11, wherein the compressible foam has an indentation load deflection of approximately between 18 and 45.

Example 13 includes the unmanned vehicle of any one of examples 1-12, wherein the compressible foam has a recovery time of approximately between 5 seconds and 1 minute.

Example 14 includes the unmanned vehicle of any one of examples 1-13, wherein the compressible foam includes a urethane material.

Example 15 includes the unmanned vehicle of any one of examples 1-14, wherein the compressible foam has a dimensional profile to extend at least partially across at least one of a housing, a propeller, or a motor of the vehicle.

Example 16 includes the method of any one of examples 1-15, wherein the compressible foam has a dimensional profile to provide an air brake during a free fall condition.

Example 17 includes an anti-crash module including a housing having a base defining a cavity. A cover being movably coupled to the base between a closed position and an open position. The cover to cover the cavity in the closed position and to uncover the cavity in the open position. A compressible foam configurable between a non-compressed state and a compressed state. The compressible foam being in the compressed state when positioned in the cavity of the base and the cover is in the closed position. A lock is to maintain the cover in the closed position relative to the base.

Example 18 includes the unmanned vehicle of example 17, wherein the lock is movable between a first position to maintain the cover in the closed position and a second position to allow the cover to move to the open position.

Example 19 includes the unmanned vehicle of any one of examples 17-18, wherein expansion of the compressible foam from the compressed state to the non-compressed state causes the cover to move to the open position when the lock is moved to the second position.

Example 20 includes the unmanned vehicle of any one of examples 17-19, wherein the lock includes a solenoid coupled to a movable shaft.

Example 21 may be an unmanned vehicle including means for generating lift; means for supporting the lift generating means; and means for absorbing an impact coupled to the means for supporting the lift generating means. The means for absorbing having a compressible foam to protect the lift generating means from damage.

Example 22 includes the unmanned vehicle of example 21, wherein the impact absorbing means includes means for housing the impact absorbing means, the housing means to enable the impact absorbing means to deploy from the housing means to protect the vehicle from impact.

Example 23 includes the unmanned vehicle of any one of examples 21-22, wherein the housing means includes a means for locking to prevent the impact absorbing means from deploying during normal operation.

Example 24 includes a method of assembling an unmanned vehicle including obtaining a housing having a propulsion system to generates lift to navigate the vehicle in an aerial mode of operation. The method includes coupling an anti-crash module to a surface of the housing, the anti-crash module having a compressible foam positioned in an enclosure of the anti-crash module that is deployable to protect the vehicle from impact.

Example 25 includes the unmanned vehicle of example 24, further including communicatively coupling a lock of the anti-crash module to a controller of the vehicle.

Example 26 is an example method of operating a safety system including receiving input signals and detecting, via a processor, a free fall condition or a collision potential of a UAV based on the received input signals. The method includes in response to detecting either the free fall condition or the collision potential, deploying a safety system having a compressible foam.

Example 27 includes the method of example 26, wherein receiving the input signals includes receiving one or more signals from a vehicle controller of the UAV.

Example 28 includes the method of any one of examples 26-27, wherein receiving the input signals includes receiving one or more signals from at least one of an orientation sensor, a position sensor or a proximity sensor of the UAV.

Example 29 includes the method of any one of examples 26-28, wherein deploying the safety system includes moving a switch to close a circuit between a battery and a solenoid of the safety system.

Example 30 includes a non-transitory machine readable medium including executable instructions that, when executed, cause at least one processor to at least: receive input signals; detect, via a processor, a free fall condition or a collision potential of a UAV based on the received input signals; and in response to detecting either the free fall condition or the collision potential, deploy a safety system having a compressible foam.

Example 31 includes non-transitory machine readable of example 30, comprising executable instructions that, when executed, cause the at least one processor to receive the input signals from a vehicle controller of the UAV.

Example 32 includes non-transitory machine readable of any one of examples 30-31, comprising executable instructions that, when executed, cause at least one processor to receive the input signals from at least one of an orientation sensor, a position sensor or a proximity sensor of the UAV.

Example 33 includes non-transitory machine readable of any one of examples 30-32, comprising executable instructions that, when executed, cause the at least one processor to move a switch to close a circuit between a battery and a solenoid of the safety system to deploy the safety system.

Example 34 is an example system including means for receiving input signals; means for detecting a free fall condition or a collision potential of a UAV based on the input signals provided by the means for receiving the input signals; and in response to detecting either the free fall condition or the collision potential, means for deploying a safety system having a compressible foam.

Example 35 includes the system of example 34, wherein the means for receiving input signals includes means for receiving feedback signals from at least one of a means for determining orientation of the UAV, means for determining a position of the UAV, or means for determining a proximity between the UAV and an external object.

Example 36 includes the system of any one of examples 34-35, wherein the means for deploying the safety system includes means for electrically coupling a power source and an actuator of the safety system.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An unmanned vehicle comprising:
   a housing;
   a propulsion system supported by the housing, the propulsion system to generate lift; and
   an anti-crash apparatus coupled to the housing, the anti-crash apparatus having a base defining a cavity to receive a bladder-less compressible foam, the base having a cover and a lock, the cover having an opening to receive the lock, the lock being movable through the opening between a latched position to retain the bladder-less compressible foam in the base and an unlatched position to enable the bladder-less compressible foam to deploy from the cavity to protect the propulsion system from an impact, the lock engaging the cover in the latched position when the cover is in a closed position, the bladder-less compressible foam to expand to move the cover from the closed position to an open position in response to the lock moving to the unlatched position and the compressible foam projecting from the cavity of the base.

2. The vehicle of claim 1, wherein the cover is over the cavity when the cover is in a closed position relative to the base.

3. The vehicle of claim 2, wherein the compressible foam is in a compressed state when stored in the cavity and the cover is over the cavity.

4. The vehicle of claim 1, wherein the lock includes a solenoid having a spring-loaded shaft.

5. The vehicle of claim 4, wherein the cover is pivotally coupled to the base via a hinge.

6. The vehicle of claim 5, wherein the solenoid is to couple to a front surface of the base opposite the hinge.

7. The vehicle of claim 6, wherein the opening is to receive the solenoid when the cover is in the closed position to enable the shaft of the solenoid to extend from the solenoid and engage the cover when the lock is in the latched position.

8. The vehicle of claim 7, wherein the solenoid moves the shaft away from the front surface of the cover to move the cover to the open position and deploy the compressible foam from the base.

9. The vehicle of claim 1, wherein the compressible foam has at least one of: a density of between approximately 1.8 pounds and 3.5 pounds of chemical used per cubic feet of the compressible foam; an indentation load deflection of between approximately 18 and 45, or a recovery time of between approximately 5 seconds and 1 minute.

10. The vehicle of claim 1, wherein the compressible foam includes a urethane material.

11. The vehicle of claim 1, wherein the compressible foam has a dimensional profile to extend at least partially across at least one of a housing, a propeller, or a motor of the vehicle.

12. The vehicle of claim 1, wherein the compressible foam has a dimensional profile to provide an air brake during a free fall condition.

13. The vehicle of claim 1, wherein the bladder-less compressible foam has an indentation load deflection of between approximately 18 and 45.

14. The vehicle of claim 1, wherein the bladder-less compressible foam has a polyhedron shape.

15. An anti-crash apparatus comprising:
    a housing having a base defining a cavity;
    a cover pivotally coupled to the base via a hinge along a first side of the base, the cover to move between a closed position and an open position, the cover to cover the cavity in the closed position and to uncover the cavity in the open position;
    a bladder-less compressible foam configurable between a non-compressed state and a compressed state, the bladder-less compressible foam being in the compressed state when positioned in the cavity of the base and the cover is in the closed position; and
    a lock coupled to the cover and the base on a second side of the cover opposite the hinge, the lock movable between a latched position and an unlatched position, the lock in the latched position to maintain the cover in the closed position relative to the base and prevent expansion of the bladder-less compressible foam, the lock in the unlatched position to allow the bladder-less compressible foam to discharge from the base, the bladder-less compressible foam to cause the cover to pivot relative to the base in response to the lock moving to the unlatched position and the bladder-less compressible foam discharging from the base.

16. The apparatus of claim 15, wherein the lock includes a solenoid having a movable shaft, the solenoid coupled to the base, the movable shaft to engage a retainer located on the cover when the lock is in the latched position, and the movable shaft to disengage the retainer of the cover when the lock is in the unlatched position.

17. An unmanned vehicle comprising:
    means for generating lift;
    means for supporting the lift generating means; and
    means for housing a bladder-less compressible foam and means for covering the bladder-less compressible foam, the means for housing to couple to the means for supporting the lift generating means, the means for covering being pivotally coupled to the means for housing between a closed position and an open position, the means for housing having means for locking, the locking means being movable between a latched position to retain the means for covering in the closed position and prevent the bladder-less compressible foam from deploying from the means for housing during normal operation and an unlatched position to allow the means for covering to move to the open position to enable the bladder-less compressible foam to expand from the means for housing to protect the lift generating means from damage during a crash event.

18. The vehicle of claim 17, further including means for moving the locking means from the latched position to the unlatched position.

19. The vehicle of claim 1, wherein the bladder-less compressible foam has an impact surface having a dimensional envelope that is greater than a dimensional envelope of a base surface of the bladder-less compressible foam that attaches to the base, the bladder-less compressible foam to provide an air brake effect during a free-fall event.

20. The vehicle of claim 17, further including means for pivotally attaching the means for covering and the means for housing.

\* \* \* \* \*